United States Patent
Yeh

(10) Patent No.: US 7,414,838 B2
(45) Date of Patent: Aug. 19, 2008

(54) HEATING DISSIPATING STRUCTURE OF AN EXTERNAL HARD DISK DRIVE BOX

(75) Inventor: Kun-Peng Yeh, Taipei County (TW)

(73) Assignee: Hotway Technology Corp., Shi Jr Taipei County (TW)

( * ) Notice: Subject to any disclaimer, the term of this patent is extended or adjusted under 35 U.S.C. 154(b) by 267 days.

(21) Appl. No.: 11/408,923

(22) Filed: Apr. 24, 2006

(65) Prior Publication Data

US 2006/0274505 A1 Dec. 7, 2006

(30) Foreign Application Priority Data

Jun. 2, 2005 (TW) ................................ 094209165

(51) Int. Cl.
H05K 7/20 (2006.01)
G11B 33/14 (2006.01)
(52) U.S. Cl. ........................ 361/688; 361/685; 361/704; 360/97.01; 360/97.02
(58) Field of Classification Search ................. 361/685, 361/688, 704, 707, 709, 710; 360/97.01, 360/97.02
See application file for complete search history.

(56) References Cited

U.S. PATENT DOCUMENTS

| 5,742,478 | A  | * | 4/1998 | Wu | ............................ | 361/704 |
| 5,828,546 | A  | * | 10/1998 | Tirrell et al. | ................ | 361/685 |
| 5,927,386 | A  | * | 7/1999 | Lin | ............................ | 165/80.3 |
| 6,289,678 | B1 | * | 9/2001 | Pandolfi | ....................... | 62/3.2 |
| 6,434,000 | B1 | * | 8/2002 | Pandolfi | ....................... | 361/685 |
| 7,054,153 | B2 | * | 5/2006 | Lewis et al. | ................. | 361/685 |
| 7,068,506 | B2 | * | 6/2006 | Behl | ........................... | 361/695 |
| 2003/0193778 | A1 | * | 10/2003 | Staiano | ....................... | 361/687 |
| 2006/0181845 | A1 | * | 8/2006 | Shah et al. | ................... | 361/685 |

* cited by examiner

Primary Examiner—Jayprakash N Gandhi
Assistant Examiner—Zachary M Pape
(74) Attorney, Agent, or Firm—Bacon & Thomas, PLLC.

(57) ABSTRACT

The present invention discloses a heating dissipating structure of an external hard disk drive box that includes a retaining base for mounting a hard disk, and the retaining base has adjusting rods that can be moved vertically up and down, and the retaining base and hard disk are covered by a heat dissipating cover, such that when the invention is assembled, the adjusting rods are rotated and pressed onto the heat dissipating cover, and the heat dissipating cover is attached closely onto the surface of the hard disk, and there exists no gap between the heat dissipating cover and the hard disk, so as to conduct the heat produced by the hard disk rapidly from the heat dissipating cover to the avoid and prevent any breakdown or failure due to an overheating.

4 Claims, 5 Drawing Sheets

HEATING DISSIPATING STRUCTURE OF AN EXTERNAL HARD DISK DRIVE BOX

BACKGROUND OF THE INVENTION

1. Field of the Invention

The present invention relates to a heat dissipating structure of an external hard disk drive box, and more particularly to a heat dissipating cover closely attached to a hard disk drive for dissipating the heat produced by the hard disk drive to the outside rapidly.

2. Description of the Related Art

Computer peripherals and accessories have become indispensable tools to our life. As various data and information are processed by electronic devices, all kinds of storage devices are introduced for storing electronic data. At present, portable data storage media include 1.44 MB floppy disks, recordable optical disks, memory cards, card readers, USB memory sticks, and portable external hard disk box installing a mini hard disk. Referring to FIG. 1 for the structure of a prior art external hard disk drive box, the structure includes an external box 100, and a hard disk 200 mounted into the external box 100. One side of the hard disk 200 is fixed onto the bottom of the external box 100, so that when the external hard disk box is in use, the external box 100 can be used for storing the hard disk 200 only, but the external box 100 has no heat dissipating function. Even if the external box 100 is made of a heat conducting material, each hard disk usually comes with a certain allowable manufacturing error, and thus there will be a gap in the external box 100 when a different hard disk 200 is installed into the external box 100. As a result, the heat produced by the hard disk 200 will remain in the external box 100 and the heat cannot be conducted to the outside through the external box 100, and the hard disk 200 may become unstable or damaged if the hard disk 200 is operated at a high temperature for a long time, and thus a data loss may occur.

SUMMARY OF THE INVENTION

In view of the shortcomings of the prior art external hard disk, the inventor of the invention based on years of experience in the related industry to conduct extensive researches and experiments, and finally invented a heat dissipating structure of an external hard disk drive box in accordance with the invention.

Therefore, it is a primary objective of the present invention to provide a heating dissipating structure of an external hard disk drive box that includes a fixing box, and the fixing box installs a hard disk therein, and the fixing box has an open retaining base sheathed thereon. Both sides of the retaining base are extended upward and bent inward to form separate flanges, and the flanges include adjusting rods that can be moved vertically up and down. The hard disk is protruded from a side of the fixing box and covered with a heat dissipating cover. The heat dissipating cover is disposed precisely under the flanges of the retaining base, such that when the invention is in use, the adjusting rods can be rotated to press the heat dissipating cover onto the surface of the hard disk, and there will be no gap between the heat dissipating cover and the hard disk. Therefore, the heat produced by the hard disk can be conducted rapidly from the heat dissipating cover to the outside, and any possible failure or breakdown due to overheating will not occur. Since the heat dissipating cover can be adjusted, therefore the problem of producing a gap when installing a different hard disk to the retaining base can be solved.

Another objective of the present invention is to provide a heating dissipating structure of an external hard disk drive box that installs a footer under a retaining base, so that the footer serves as a space for the retaining base, and the retaining base will not be placed directly onto a disposing place but will maintain a certain distance from the disposing place, so as to facilitate heat dissipations.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
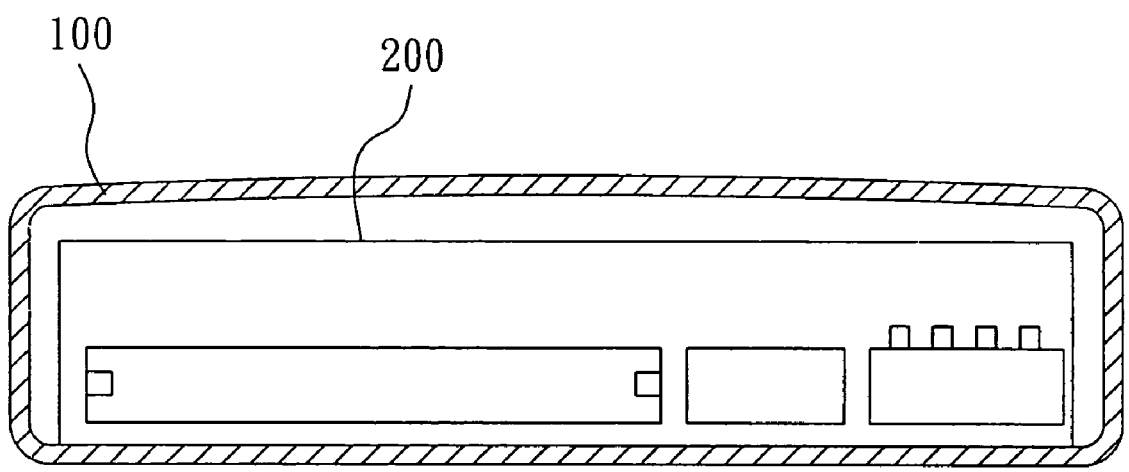
FIG. 1 is a schematic view of a prior art apparatus.
Figure 2:
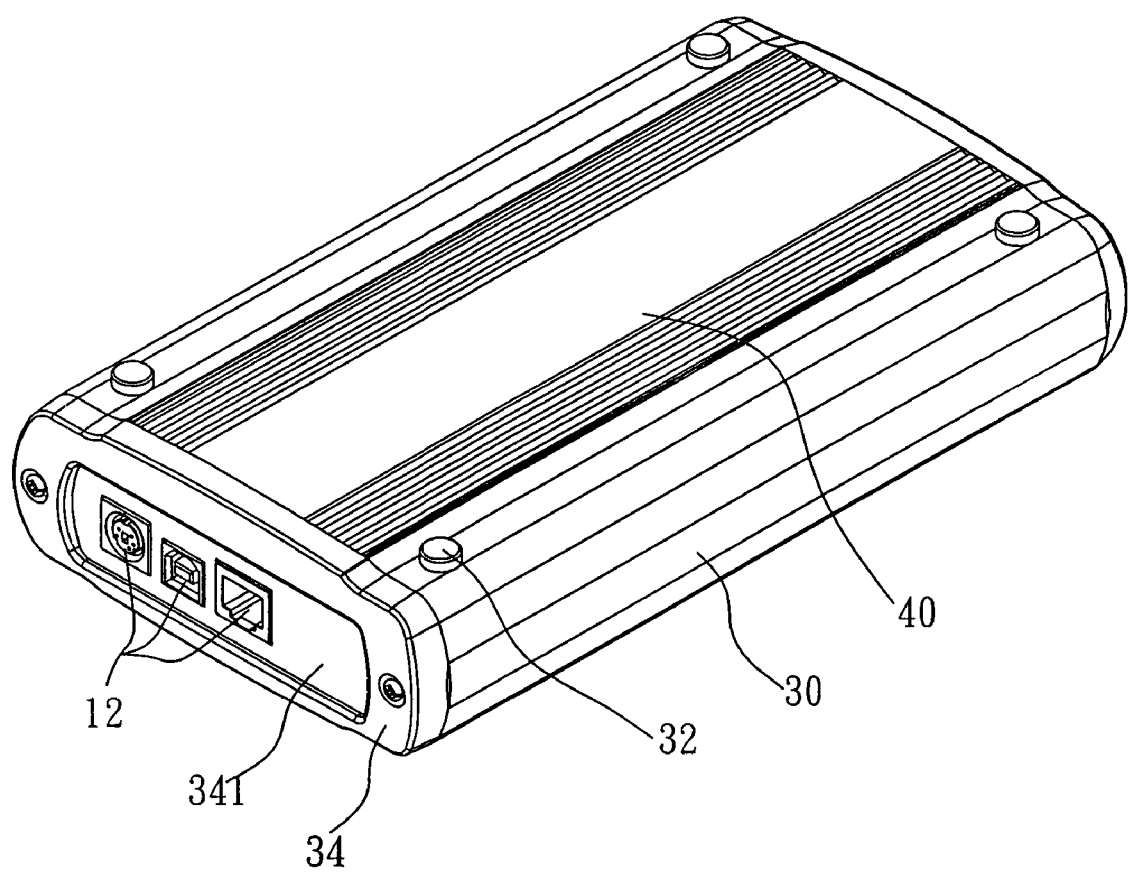
FIG. 2 is a perspective view of the present invention.
Figure 3:
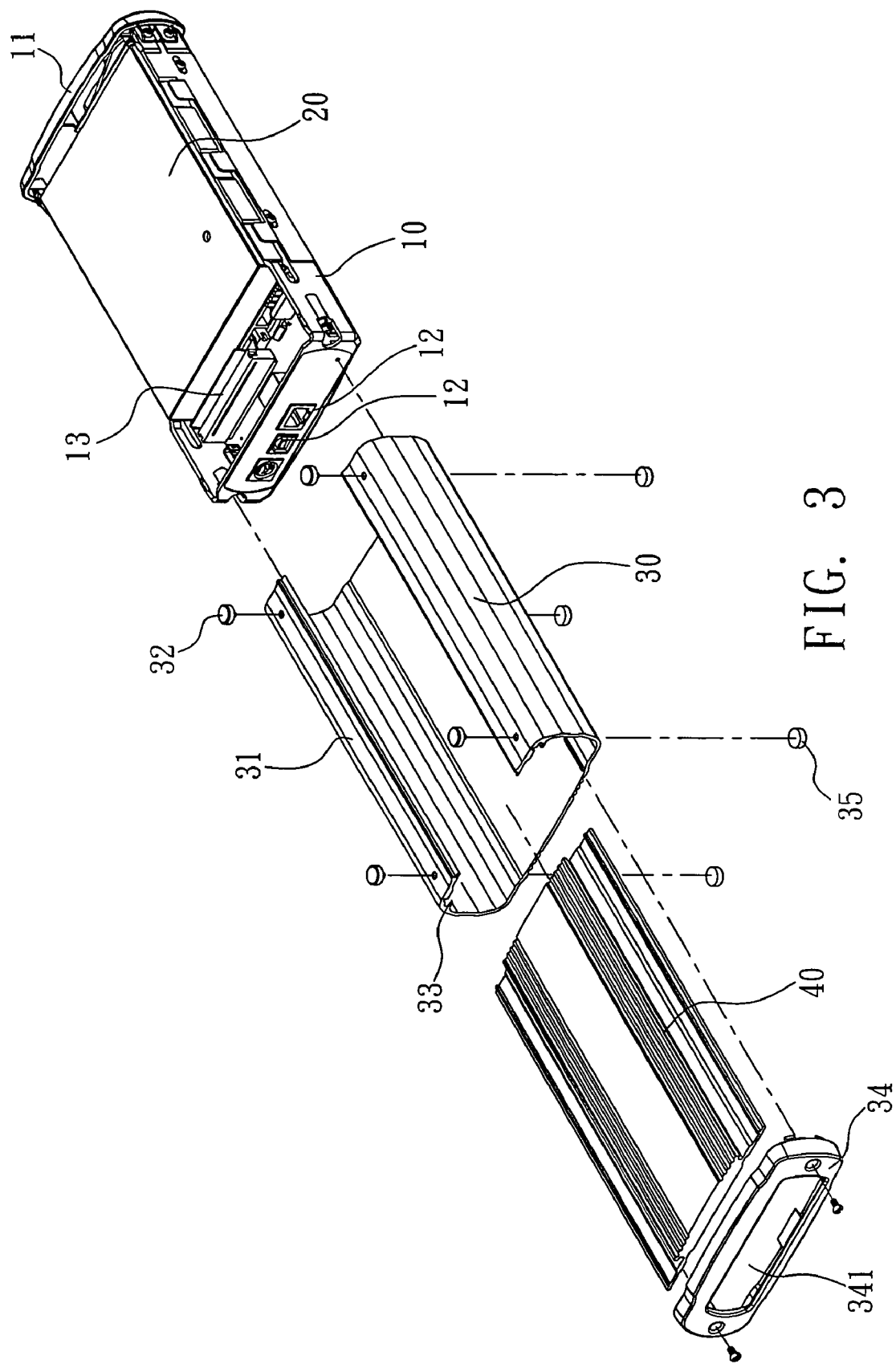
FIG. 3 is an exploded view of the present invention.
Figure 4:
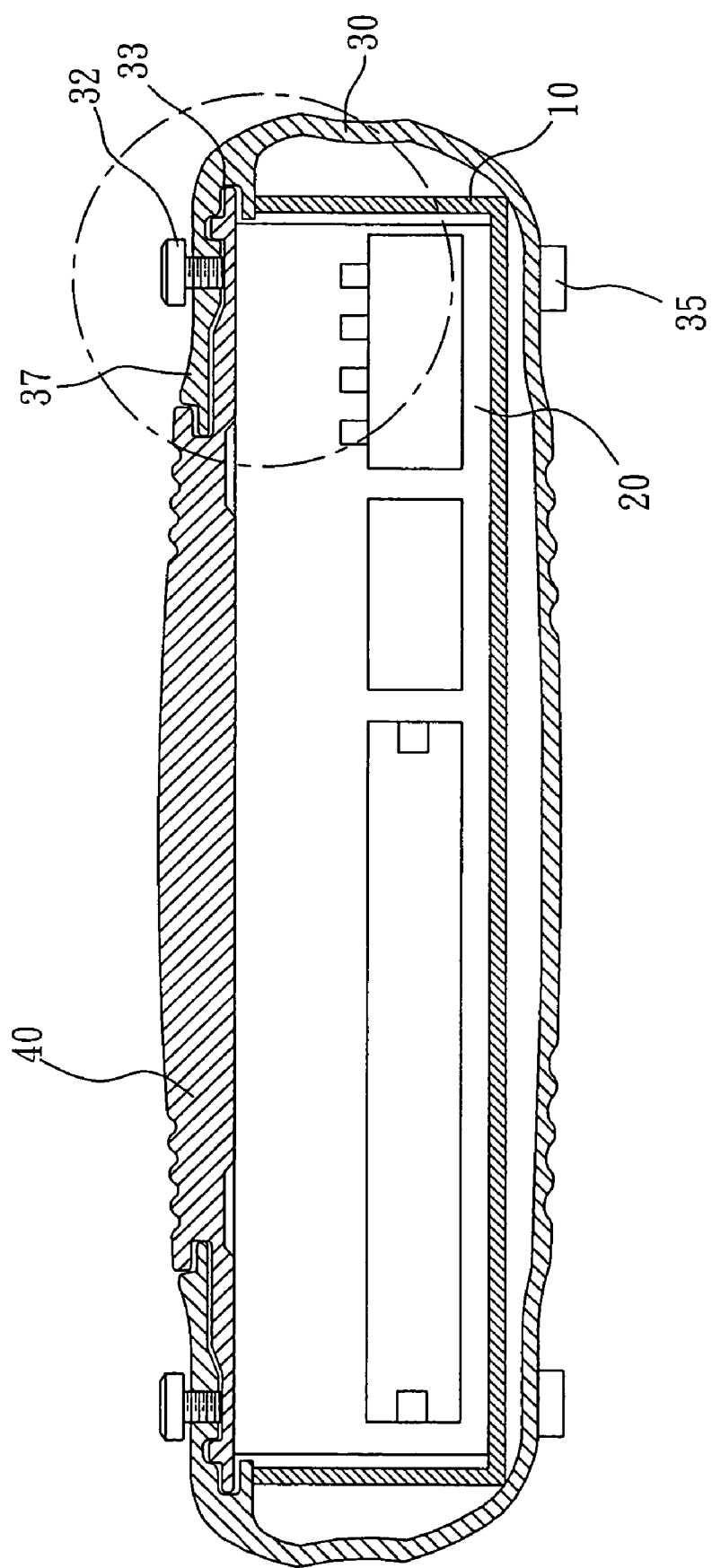
FIG. 4 is a cross-sectional view of the present invention.

Referring to FIGS. 2 and 3 for a heating dissipating structure of an external hard disk drive box of the present invention, the invention relates to a heating dissipating structure of an external hard disk drive box, which is applied to an electronic product. The heat dissipating structure includes a fixing box 10, and one side of the fixing box 10 is open, and the front end of the fixing box 10 has a front panel 11, and the front panel 11 could be in any shape, and the rear end of the fixing box 10 has a plurality of sockets 12, and these sockets 12 include a power socket and a USB socket, etc. The fixing box 10 further includes a control circuit board 13 installed at an appropriate position, and coupled to the sockets 12 for its control and operation. Further, the fixing box 10 includes a hard disk 20 fixed therein and secured into the fixing box 10 by a locking method, and the hard disk 20 is coupled to the control circuit board 13 by an inserting method.

Figure 5:
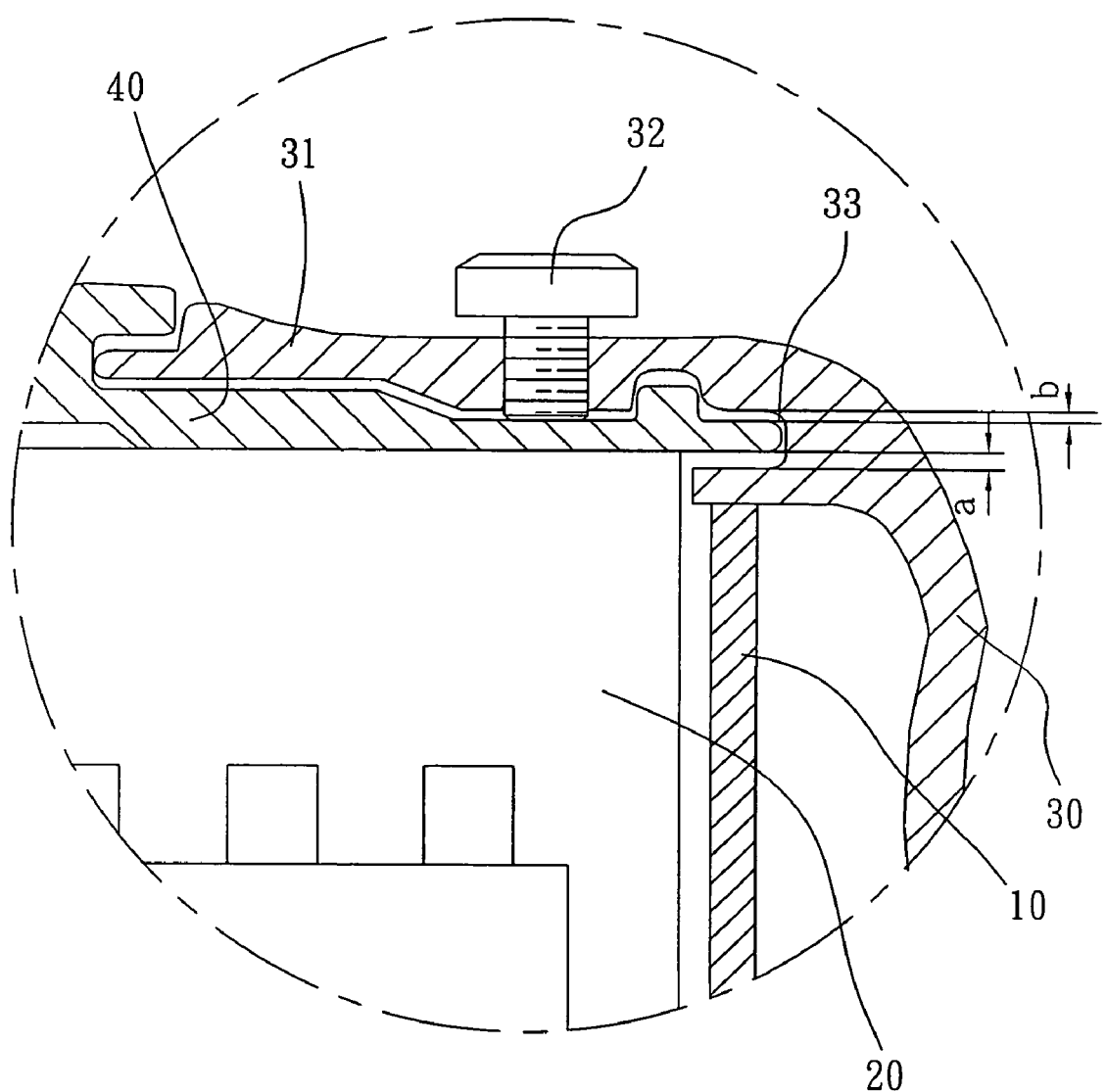
FIG. 5 is an enlarged view of installing an adjusting rod of a retaining base to a heat dissipating cover according to the present invention.

Further, the fixing box 10 has an open retaining base 30 sheathed thereon, and the fixing box 10 is a U-shape casing adopted in this embodiment. The retaining base 30 could be made of a heat dissipating material such as aluminum, and the retaining base 30 is coupled to a front panel 11 on the fixing box 10, and both sides of the retaining base 30 are extended upward and bent inward to separately form a flange 31. The flanges 31 include at least one adjusting rod 32, and the flanges 31 are adjusting screws adopted in this embodiment, so that the adjusting rods 32 can be moved vertically up and down. Further, an embedding channel 33 is extended horizontally along the connecting position of the flange 31 and the retaining base 30, and the embedding channels 33 include a heat dissipating cover 40 and the heat dissipating cover 40 is a board made of a heat dissipating material in this embodiment. The height of the heat dissipating cover 40 is smaller than the height of the embedding channel 33, so that the heat dissipating cover 40 maintains a moving space (marked at the position a+b) in the embedding channel 33 as shown in FIG. 5.

Further, the retaining base 30 includes a back panel 34 disposed at an end of the front panel 11 without being secured, and the back panel 34 has a slot 341 therein for exposing the sockets 12, and the retaining base 30 includes a footer 35 disposed at the bottom of the retaining base 30 and used as a spacer.

Referring to FIGS. 2 to 5, the hard disk 20 is installed in the fixing box 10, and the retaining base 30 is engaged under the fixing box 10, and the front panel 11 is coupled to the retaining base 30, and the heat dissipating cover 40 is embedded into the embedding channel 33, such that the adjusting rod 32 is rotated to press the heat dissipating cover 40 onto the surface of the hard disk 20. The present invention not only overcomes the error produced during the manufacturing of the hard disk 20, but also attaches the heat dissipating cover 40 closely onto the hard disk 20 and thus preventing a gap formed between the heat dissipating cover 40 and the hard disk 20 and further conducting the heat produced by the hard disk 20 rapidly from the heat dissipating cover 40 to the outside as well as preventing any possible breakdown or failure due to overheating.

In summation of the description above, the heating dissipating structure of an external hard disk drive box of the invention has an overall simple structure that can be used for any portable storage device, and its use is very convenient and the invention complies with the patent application requirements.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A heating dissipating structure of an external hard disk drive box, which is applied for an electronic product, comprising:
    a retaining base, being in an open form, and having a flange disposed separately on both open ends of said retaining base and inwardly bent, at least one adjusting rod disposed at said flanges, and an embedding channel extended horizontally along the connecting position of said flange and said retaining base; and
    a heat dissipating cover, embedded into said embedding channel of said retaining base;
    such that when the foregoing elements are assembled, said hard disk is installed in said retaining base, and said adjusting rod is rotated to press said heat dissipating cover onto the surface of said hard disk, and no gap exists between said heat dissipating cover and said hard disk, so as to conduct the heat produced by said hard disk rapidly from said heat dissipating cover to the outside and prevent a breakdown or a failure due to overheating, and said heat dissipating cover can be adjusted to solve the gap problem produced when installing a different hard disk to said retaining base.

2. The heating dissipating structure of an external hard disk drive box of claim 1, wherein said retaining base includes a fixing box for mounting said hard disk.

3. The heating dissipating structure of an external hard disk drive box of claim 1, wherein said retaining base includes a footer disposed at the bottom of said retaining base and served as a spacer.

4. The heating dissipating structure of an external hard disk drive box of claim 1, wherein said heat dissipating cover is made of a heat dissipating material.

* * * * *